United States Patent [19]

Kato et al.

[11] Patent Number: 5,276,713

[45] Date of Patent: Jan. 4, 1994

[54] METHOD OF FRAME SYNCHRONIZATION FOR DIGITAL MOBILE RADIO COMMUNICATION

[75] Inventors: Osamu Kato; Kouichi Honma; Kazuhisa Tsubaki, all of Yokohama, Japan

[73] Assignee: Matsushita Electric Industrial Co., Ltd., Osaka, Japan

[21] Appl. No.: 768,289

[22] PCT Filed: Feb. 26, 1991

[86] PCT No.: PCT/JP91/00248

§ 371 Date: Oct. 10, 1991

§ 102(e) Date: Oct. 10, 1991

[87] PCT Pub. No.: WO91/13501

PCT Pub. Date: Sep. 5, 1991

[30] Foreign Application Priority Data

Feb. 28, 1990 [JP] Japan ................................ 2-47555

[51] Int. Cl.$^5$ ............................................... H04L 7/06
[52] U.S. Cl. ...................................... 375/113; 375/118
[58] Field of Search ................ 370/105.1, 98, 93, 101; 375/113, 117, 119, 118

[56] References Cited

U.S. PATENT DOCUMENTS 4,129,755 12/1978 Murakami ........................ 370/105.1
4,316,284 2/1982 Howson .............................. 370/105
4,872,155 10/1989 Yokogawa et al. ............. 375/113 X

FOREIGN PATENT DOCUMENTS

0256595A2 2/1988 European Pat. Off. .
63-31235 2/1988 Japan .
1133441 5/1989 Japan .

OTHER PUBLICATIONS

Patent Abstracts of Japan, No. 9085 (E-308) 13 Apr. 1985 & JP-A-59 215 115 (Fujitsu K.K.) 20 May 1983.
Patent Abstracts of Japan, No. 5205 (E-088) 25 Dec. 1981 & JP-A-56 125 135 (NEC Corp.) 1 Oct. 1981.
Electrical Communication Laboratories Technical Journal, vol. 32, No. 4 pp. 861-873, Apr. 22, 1983.

Primary Examiner—Curtis Kuntz
Assistant Examiner—Bryan Webster
Attorney, Agent, or Firm—Stevens, Davis, Miller & Mosher

[57] ABSTRACT

The present invention relates to a frame synchronization method for digital mobile radio communication comprising generating a plurality of pulses having different phases on the basis of an asynchronous frame marker, and generating a synchronous frame marker on the basis of the pulses. In the method, a pulse having the same phase as that of the asynchronous frame marker, another pulse having its phase delayed by ½ of one clock period and another pulse having its phase delayed by one clock period are generated to be suitably selected.

2 Claims, 4 Drawing Sheets

METHOD OF FRAME SYNCHRONIZATION FOR DIGITAL MOBILE RADIO COMMUNICATION

TECHNICAL FIELD

This invention relates to the art of frame synchronization in the field of digital mobile radio communication.

BACKGROUND ART

In the TDMA (Time Division Multiple Access) communication method utilized in the field of digital mobile radio communication, frame synchronization is required between a mobile station and a base station. However, because the distance between the mobile station and the base station as well as the path of radio wave propagation between the stations incessantly changes, the time required for the arrival of the radio wave also necessarily changes.

Therefore, when the period of burst data transmission at the mobile station is always set at a constant value T, a change in the distance between the mobile station and the base station or a change in the path of radio wave propagation between the stations results in, for example, a shortened or extended time required for the arrival of the radio wave. Consequently, the number of bits to be received in one burst data transmission period T at the mobile station decreases or increases by one bit, and an error occurs during decoding.

In order to prevent such a trouble, the radio wave propagation time is measured at the base station, and this data is provided to the mobile station, so that the period of burst data transmission at the mobile station deviates within the range of the pulse width tw of one data bit.

On the basis of the frame marker of the burst data transmission period T±td having the period deviation td, the mobile station carries out, for example, speech encoding for each frame unit, and the encoded data is transmitted as the burst data at the predetermined period of burst transmission For the purpose of attaining such speech encoding and other processing, it is necessary that the period T±td of the frame marker is maintained at a value which is n times (n: an integer) as large as the period Tc of the clock that determines the processing timing. That is, synchronization between them is required.

A prior art method for frame synchronization will now be described by reference to FIG. 5.

In FIG. 5, it is supposed that, in the period T±td of an asynchronous frame marker AFM, T is selected to be T=20 msec, and td is selected to be 3.7 μsec at a transmission rate of 270 kb/s and 20 μsec at a transmission rate of 50 kb/s, while the period Tc of the clock CLK used for the speech encoding is selected to be 125 μsec.

As shown at FIG. 5 (I), the leading edge of a first clock CLK applied immediately after the risetime of an asynchronous frame marker is detected, and this clock is used as a synchronous frame marker SFM. According to such a method, the number of the clocks CLK included between the consecutive synchronous frame markers SFM corresponds to the number of predetermined periods, that is, T/Tc=20/125=160 periods, when the consecutive plural asynchronous frame markers AFM(a) and AFM(b) are all present on the sam side (the side immediately before the risetime of the clocks CLK in FIG. 5) when the risetime of the clocks CLK is considered as the border on each side.

However, an extra clock CLK will be included to increase the number of clocks corresponding to 161 periods when, as shown in FIG. 5 (II), the leading one (a) of the consecutive asynchronous frame markers AFM is present immediately before the risetime of the associated clock CLK, and the trailing asynchronous frame marker (b) is present immediately after the risetime of the associated clock CLK.

On the other hand, the number of periods is only 159 which is less by one period than the predetermined value when, as shown in FIG. 5 (III), the leading one (a) of the consecutive asynchronous frame markers AFM is present immediately after the risetime of the associated clock CLK, and the trailing asynchronous frame marker (b) is present immediately before the risetime of the associated clock CLK.

Thus, the prior art frame synchronization method has had the problem that, when the asynchronous frame marker is present in the vicinity of the risetime of the associated clock CLK, the period of the synchronous frame marker SFM becomes larger or smaller by one bit depending on the position of the asynchronous frame marker.

The present invention solves such a problem, and its object is to provide a novel frame synchronization method in which the synchronous frame marker having a predetermined constant period can be generated regardless of the wave propagation time.

SUMMARY OF THE INVENTION

In the present invention which solves the prior art problem, a pulse signal having the same phase as that of the asynchronous frame marker, another pulse signal delayed by ½ of one clock period from the asynchronous frame marker and still another pulse signal delayed by one clock period from the asynchronous frame marker are generated, and they are suitably selected A pulse not present in the vicinity of the risetime of a clock is selected, and the leading edge of a synchronous frame marker is made to coincide with the leading edge of a first clock rising immediately after this pulse, so as to eliminate period deviation of the asynchronous frame marker

BRIEF DESCRIPTION OF THE DRAWINGS

FIGS. 5(I), 5(II) and 5(III) are timing charts showing synchronous frame markers generated according to the prior art frame synchronization method, respectively.

BEST MODE FOR CARRYING OUT THE INVENTION

An embodiment of the present invention will now be described in detail.

Figure 1:
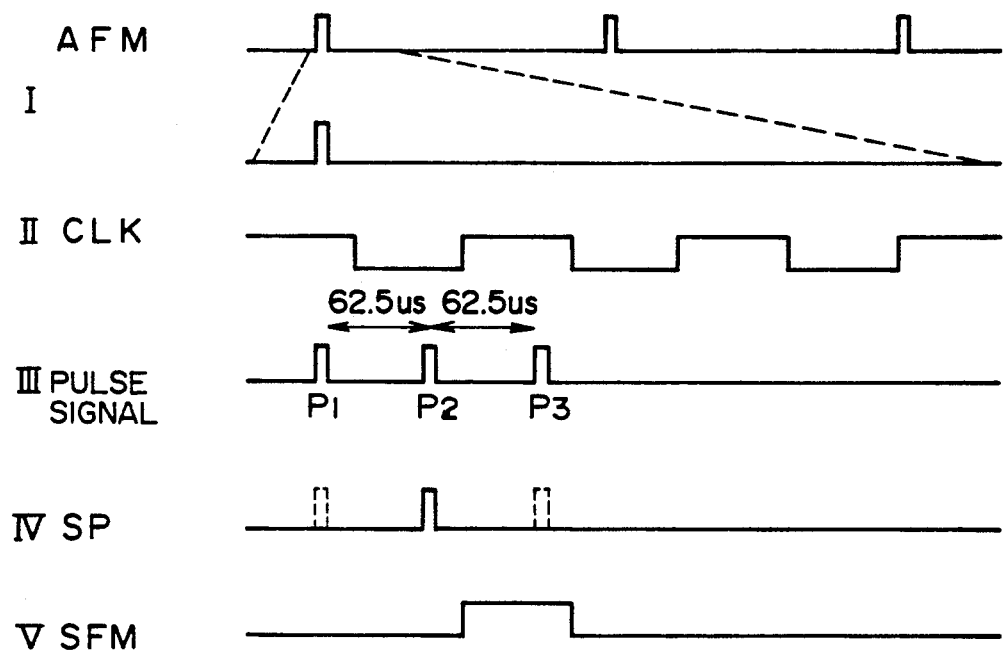
FIG. 1 is a timing chart showing an embodiment of the present invention.

FIG. 1 schematically illustrates the frame synchronization method of the present invention.

The symbol indicates an asynchronous frame marker received at a mobile station, and, to a constant period T determined by a base station, period deviation ±td attributable to a variation of the wave propagation time between the base station and the mobile station is added. The upper part of the graph associated with symbol I shows multiple AFM pulses. As shown by the dotted lines, the lower portion of the graph has an expanded time axis. This expanded time axis is also used for the graphs associated with symbols II–V. The method will now be described with reference to the case where the period T is selected as T=20 msec.

The symbol indicates a clock used in the transmitter part when a data input is applied from an analog-digital converter or when a speech is encoded. The period Tc is constant, and the embodiment will now be described with reference to the case where Tc is 125 μsec.

Therefore, in this embodiment, the relation T=160 ×Tc holds when the frame marker is regularly synchronized.

The symbol indicates three kinds of pulse signals P1, P2 and P3 which are the feature of the present invention. The first pulse signal P1 has the same phase as that of the asynchronous frame marker AFM, the second pulse signal P2 has its phase delayed from that of the asynchronous frame marker AFM by ½ of the clock period Tc, that is, Tc/2, and the third pulse signal P3 has its phase delayed by one clock period Tc.

The symbol IV indicates a selected pulse by selecting one of the aforementioned three pulse signals P1, P2 and P3 and FIG. 1 shows that the second pulse signal P2 is selected.

The symbol V indicates a synchronous frame marker SFM generated immediately after the risetime of the second pulse signal P2 on the basis of the selected second pulse signal P2.

Figure 2:
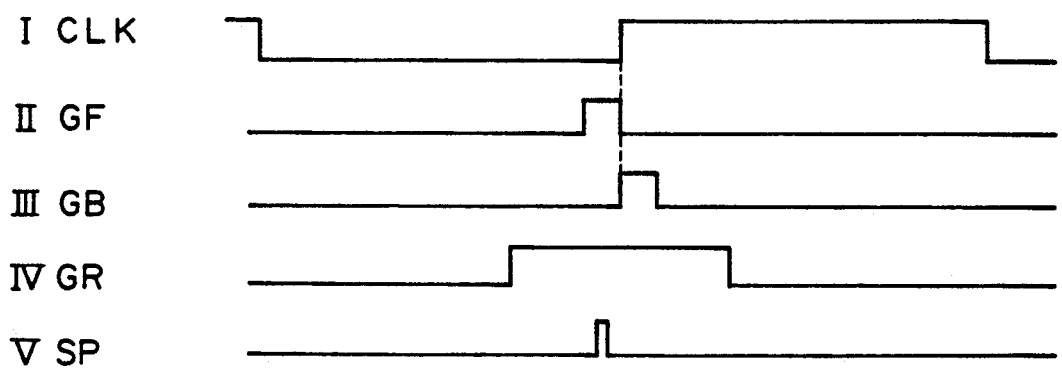
FIG. 2 schematically illustrates the operation of gates.

FIG. 2 shows the operation timing of various gates. The symbol indicates a clock CLK. The symbol indicates that a gate GF is in its H level for only a period TF immediately before the risetime of the clock CLK, symbol indicates that a gate GB is in its H level for only a period TB immediately after the risetime of the clock CLK, and symbol indicates that a gate GR is in its H level for only a period TR whose center is the risetime of the clock CLK. These gate periods TF, TB and TR are selected to be sufficiently small relative to the period of the clock CLK respectively. For example, with respect to the period, 125 μsec, of the clock CLK, TF =TB=125/16=7.8 μsec and TR=125/4=31.2 μsec are selected.

The manner of selection of the three pulse signals P1, P2 and P3 described above will be explained by reference to a transition diagram shown in FIG. 3.

(1) The pulse signal P2 delayed by Tc/2 relative to the asynchronous frame marker AFM is initially selected as the pulse signal.

(2) When, under the above condition, the select pulse is applied in a period Tf before the leading edge of the clock CLK, that is, when the select pulse is detected by the gate GF, the first pulse signal P1 is selected as the pulse signal to deal with the asynchronous frame marker in the next period. That is, the first pulse signal P1 having the same phase as that of the asynchronous frame marker AFM is selected (FIG. 3 I).

On the other hand, when, under the condition where the second pulse signal P2 is selected, the selected pulse is applied for a period Tb after the leading edge of the clock CLK, the third pulse signal P3 is selected as the pulse signal to deal with the asynchronous frame marker in the next period. That is, the third pulse signal P3 whose phase is delayed by one period Tc of the clock CLK relative to the asynchronous frame marker AFM is selected (FIG. 3 II).

Figure 3:
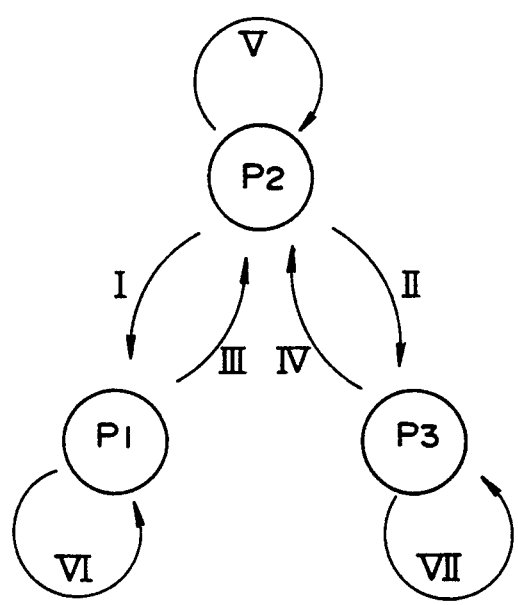
FIG. 3 illustrates transition of a selected pulse signal.

When, under the condition where the first or third pulse signal P1 or P3 is selected, the selected pulse is applied for the period TR whose center is the risetime of the clock CLK, the second pulse signal P2 is selected again to deal with the asynchronous frame marker in the next period (FIG. 3 III, IV).

In other case, the pulse signal presently selected is maintained (FIG. 3 V, VI, VII).

Table 1 shows the results of investigation of the period of the synchronous frame marker SFM generated when the pulse signals P1, P2 and P3 are selected according to the transition rule described above.

TABLE 1

| | Transition of SP | | |
|---|---|---|---|
| | A → | B | Value of N |
| I | P2 | P1 | 160 |
| II | P2 | P3 | 160, 161 |
| III | P1 | P2 | 160 |
| IV | P3 | P2 | 159, 160 |
| V | P2 | P2 | 160 |
| VI | P1 | P1 | 160 |
| VII | P3 | P3 | 160 |

It will be apparent from Table 1 that the period has the required value of 160×Tc except the case (II of Table 1) where the transition from the first pulse signal to the second pulse signal occurs or the case (IV of Table 1) where the transition from the third pulse signal to the second pulse signal occurs.

However, the selected pulse initially selected is the second pulse signal P2, that is, the pulse signal whose phase is delayed by Tc/2 from the asynchronous frame marker. Thus, immediately after the transition of the second pulse signal to the other pulse signal, that is, the first pulse signal P1 or the third pulse signal P3, the first pulse signal P1 and the third pulse signal P3 are merely delayed by Tc/2 relative to the asynchronous frame marker AFM respectively Therefore, in order that the signal can be applied to the gate GR (FIG. 2 IV) having the time width Tr, deviation of the period of the asynchronous frame marker must be more than about ±(Tc−TR)/2.

This will be considered with respect to the case where Tc =125 μsec, TR =31.2 μsec, and the transmission rate is 270 kb/s. It is necessary for the propagation time to change by an amount equal to (Tc−TR)/2+td =13, that is, the time (3.7×13 =48 μsec) which is 13 times as long as the time required for the transmission of one bit.

When converted into the propagation distance, this time corresponds to 14.4 km. Therefore, because the zone radius of the digital land mobile radio telephone system now in use is only 3 to 5 km, such a period deviation cannot actually occur.

Therefore, the states II and IV in Table 1 cannot occur actually, and a synchronous frame marker not including period deviation can be generated as a matter of practice.

Figure 4:
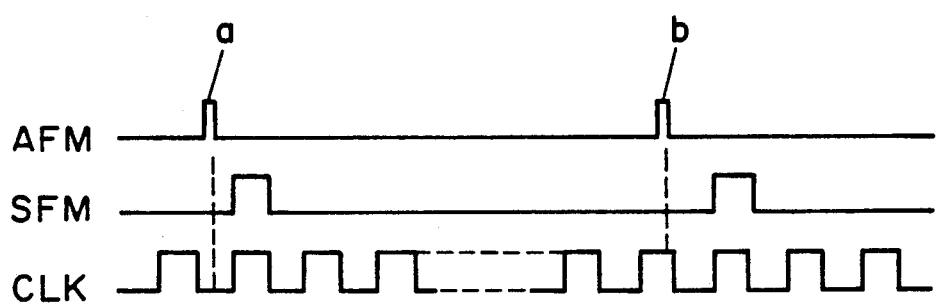
FIG. 4 shows frame markers generated according to the method of the present invention.
Figure 5:
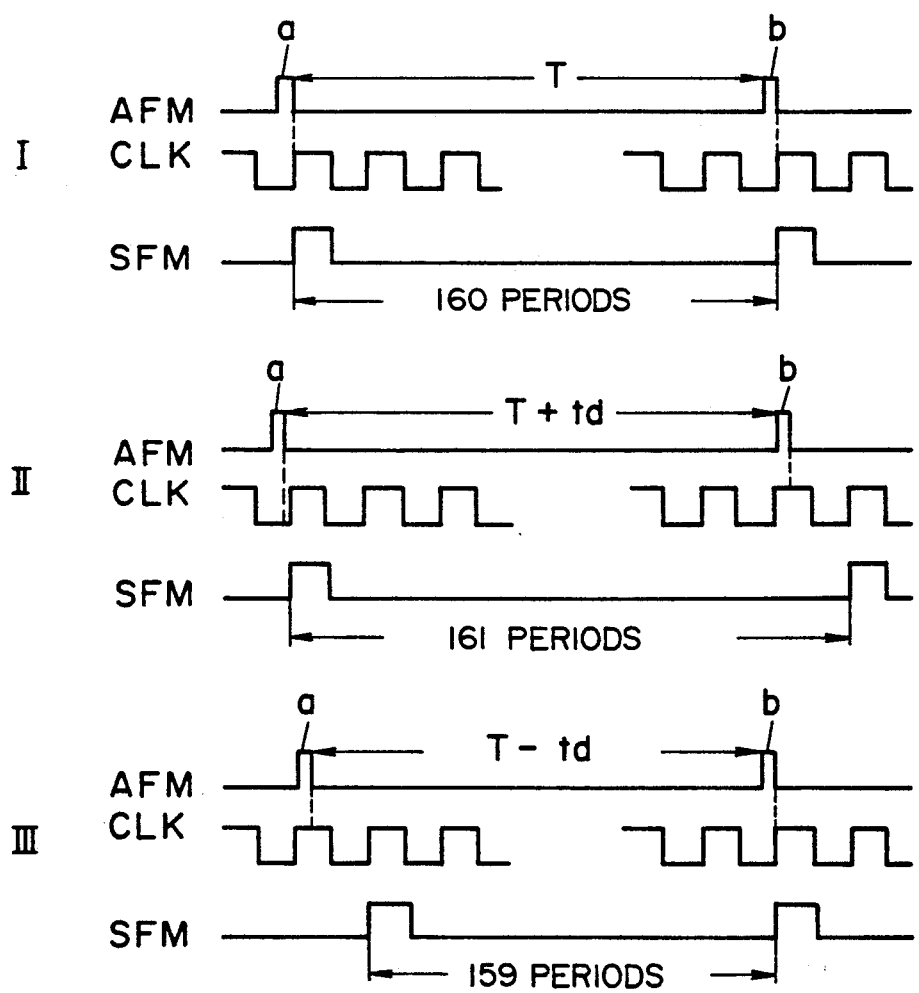
Figure 6:
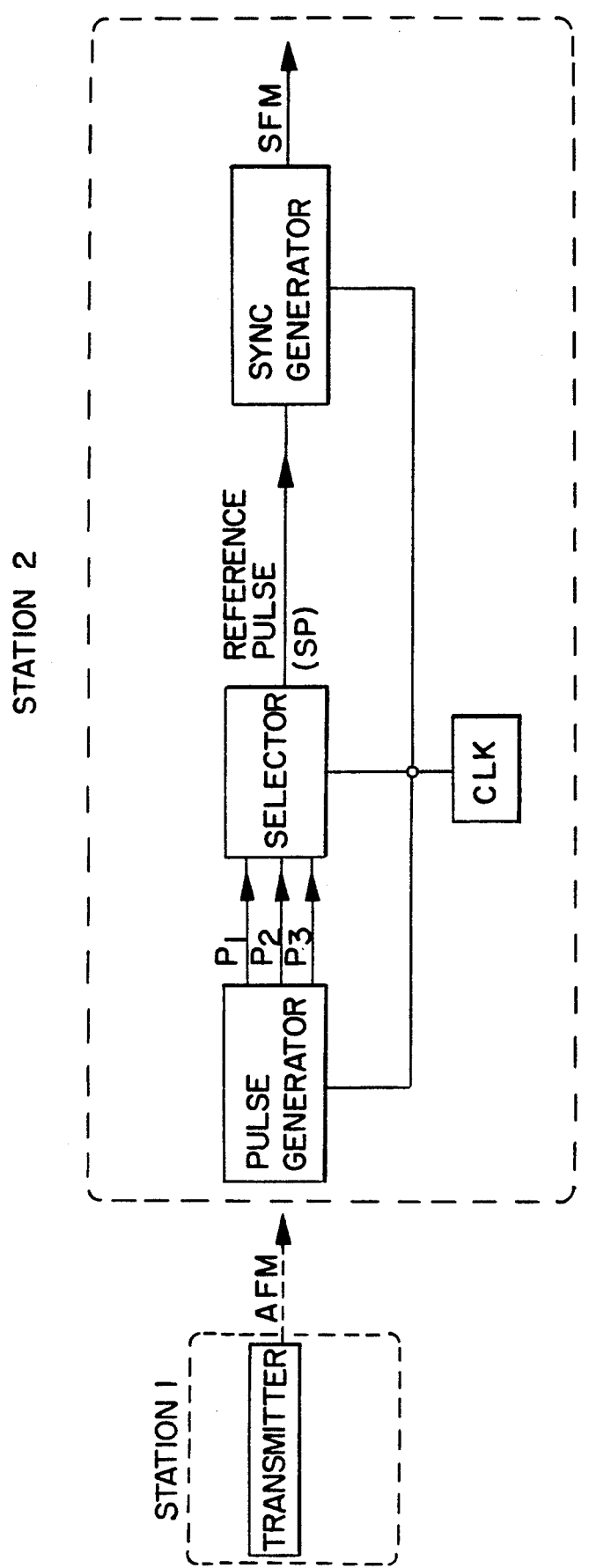
FIG. 6 schematically illustrates an apparatus for carrying out the present invention.

Thus, even when the leading one (a) of consecutive asynchronous frame markers AFM may appear, for example, immediately before the risetime of the associated clock CLK, or when the trailing asynchronous frame marker (b) may appear immediately after the risetime of the associated clock CLK, the synchronous frame markers SFM having the required period can be generated as shown in FIG. 4. A typical arrangement of the present invention is schematically shown in FIG. 6. In FIG. 6, for sake of simplicity, only the elements directly related to the present invention are shown.

INDUSTRIAL APPLICABILITY

It will be understood from the foregoing description that, in the present invention, three kinds of pulses, that is, a pulse whose phase is the same as that of an asynchronous frame marker, another pulse whose phase is delayed from the asynchronous frame marker by ½ of one clock period and still another pulse whose period is delayed from the asynchronous frame marker by one clock period are prepared, one of the pulses not present in the vicinity of the risetime of a clock being selected, and a synchronous frame marker is generated at the risetime of a first clock immediately after the risetime of the selected pulse. Therefore, the period deviation of the asynchronous frame marker attributable to a change in the radio wave propagation time can be eliminated to ensure radio communication with high reliability.

We claim:

1. A method of producing a synchronous frame marker signal in a digital mobile radio communication system, wherein each frame of data transmitted between two stations is processed in one of the stations based on a synchronous frame marker signal synchronized with a clock signal which is produced in said one of the stations, said method comprising:

generating first, second and third pulse signals in said one of the stations based on an asynchronous frame marker signal transmitted from the other station, said first pulse signal having a phase which is the same as the phase of said asynchronous frame marker signal, said second pulse signal having a phase which is delayed by a half cycle of said clock signal relative to said asynchronous frame marker signal, said third pulse signal having a phase which is delayed by one cycle of said clock signal relative to said asynchronous frame marker signal;

selecting said second pulse signal as a reference pulse signal when initiating digital mobile radio communication;

generating said synchronous frame marker signal based on said reference pulse signal and said clock signal such that said synchronous frame marker signal rises at a risetime of said clock signal which occurs immediately after a risetime of said reference pulse signal;

selecting said first pulse signal as a new reference signal when a risetime of said second pulse signal occurs within a first predetermined time interval, said first predetermined time interval being before a risetime of said clock signal during one cycle of said asynchronous frame marker signal and selecting said third pulse signal as a new reference pulse signal when a risetime of said second pulse signal is within a second predetermined time interval, said second predetermined time interval being after a risetime of said clock signal in one cycle of said asynchronous frame marker signal; and generating said synchronous frame marker signal based on the new reference pulse signal and said clock signal such that said synchronous frame marker signal rises at a risetime of said clock signal which occurs immediately after a risetime of the new reference pulse signal.

2. A method according to claim 1 further comprising:

selecting said second pulse signal as a further new reference signal when a risetime of the new reference pulse signal is within a third predetermined time interval, said third predetermined time interval extending before and after a risetime of said clock signal during one cycle of said asynchronous frame marker signal; and generating said synchronous frame marker signal based on the further new reference pulse signal and said clock signal such that said synchronous frame marker signal rises at a risetime of said clock signal which occurs immediately after a risetime of the further new reference pulse signal.

* * * * *